(12) United States Patent
Kim

(10) Patent No.: US 6,675,945 B2
(45) Date of Patent: Jan. 13, 2004

(54) SEAT CUSHION PUMPING DEVICE FOR VEHICLE

(75) Inventor: Jae Ho Kim, Kyungju-Shi (KR)

(73) Assignee: Daebu Machinery Co., Ltd., Kyungiu-Shi (KR)

( * ) Notice: Subject to any disclaimer, the term of this patent is extended or adjusted under 35 U.S.C. 154(b) by 0 days.

(21) Appl. No.: 10/252,009

(22) Filed: Sep. 23, 2002

(65) Prior Publication Data
US 2003/0173182 A1 Sep. 18, 2003

(30) Foreign Application Priority Data
Mar. 14, 2002 (KR) ........................................ 2002-13741

(51) Int. Cl.[7] ............................................. B60N 2/02
(52) U.S. Cl. .......................................... 192/223; 297/374
(58) Field of Search .......................... 192/223, 223.1, 192/43.1; 297/367, 374; 74/528; 188/82.77

(56) References Cited

U.S. PATENT DOCUMENTS

| | | | | |
|---|---|---|---|---|
| 3,554,337 A | * | 1/1971 | Denkowski | 192/223.2 |
| 6,032,777 A | * | 3/2000 | Denis | 192/223.2 |
| 6,273,233 B1 | * | 8/2001 | Denis | 192/223.2 |
| 6,389,917 B1 | * | 5/2002 | Oberle | 74/412 TA |
| 6,481,557 B2 | * | 11/2002 | Denis | 192/223.2 |
| 6,520,307 B2 | * | 2/2003 | Becker et al. | 192/223 |
| 6,520,584 B1 | * | 2/2003 | Tame | 297/374 |

\* cited by examiner

*Primary Examiner*—Saul Rodriquez
(74) *Attorney, Agent, or Firm*—Jacobson Holman PLLC

(57) ABSTRACT

Disclosed is a seat cushion pumping device for a vehicle. The device comprises a clutch section arranged between a clutch cover and a base member to generate operating force required for adjusting a height of a seat cushion, and a brake section arranged between a brake cover and the base member to conserve operating force of the clutch section. The clutch section includes a pair of clutch blocks, a lever block interposed between the pair of clutch blocks to operate them, and a lever coupled with the lever block and having a lever spring. The brake section includes a link connection gear meshed with a gear of link means, an operating plate secured around a shaft while being positioned between the link connection gear and the base member, power transmitting projections integrally formed on the base member and fitted into grooves defined on a circumferential outer surface of the operating plate to transmit operating force of the clutch section to the operating plate, brake pins each accommodated between an inclined wedge-shaped groove of the operating plate and the brake cover to transmit operating force of the base member only in an operating direction, brake springs each installed between two brake pins to be capable of fixedly maintaining the brake pins between the inclined wedge-shaped groove and the brake cover, and pushing pins integrally formed with the power transmitting projections to free the brake pins when the lever is returned to its original position.

2 Claims, 9 Drawing Sheets

SEAT CUSHION PUMPING DEVICE FOR VEHICLE

BACKGROUND OF THE INVENTION

1. Field of the Invention

The present invention relates to a seat cushion pumping device for a vehicle which has an improved construction for allowing a height of a seat cushion to be adjusted in conformity with a body figure of an occupant.

2. Description of the Related Art

Vehicle seats function to support occupants in a sitting position. Generally, vehicle seats are divided into a separation type seat which is used as a driver's seat and a front passenger seat to allow one person to sit thereon and a bench type seat which is used as a rear passenger seat to allow several persons to sit thereon at the same time.

A seat is composed of a seat cushion and a seat back. The seat cushion and seat back surround their respective frames which are made of metallic material to form skeletons of the seat cushion and seat back. The seat cushion and seat back are brought into contact with the body of an occupant to render riding comfort and ensure a correct sitting posture.

The seat is supported by a seat rail assembly. The seat rail assembly comprises a lower rail which is fastened to a floor panel of a vehicle body and an upper rail which is operatively coupled with the lower rail. The upper rail can slide on the lower rail to move the seat to a desired position. Link means is disposed inside the seat rail assembly. The link means is connected to a knob provided to a side surface of the seat cushion and constitutes a part of a seat cushion pumping device for allowing a height of the seat cushion to be adjusted as desired.

Referring to FIG. 9, there is shown a schematic side view illustrating a state wherein a conventional seat cushion pumping device is applied to a seat cushion of a vehicle. A seat has a seat back and a seat cushion 2. The conventional seat cushion pumping device designated by the reference numeral 20 includes a front knob 4 and a rear knob 5 which are provided to a side surface of the seat cushion 2. Link means positioned below the seat cushion 2 is connected to the front and rear knobs 4 and 5. By rotating, like a dial, the front and rear knobs 4 and 5 in clockwise and/or counterclockwise directions, the link means can be lifted or lowered to adjust a height of the seat cushion 2.

The front and rear knobs 4 and 5 have their respective operating gears 6. The operating gears 6 are meshed with sector gears 11 and 12 connected with front and rear legs 7 and 8 which support front and rear portions of the seat cushion 2, respectively.

Describing operations of the seat cushion pumping device 20 constructed as mentioned above, by rotating the front and rear knobs 4 and 5 in clockwise and/or counterclockwise directions, the sector gears 11 and 12 meshed with the operating gears 6 of the front and rear knobs 4 and 5 are rotated. As a result of this, the front and rear links 9 and 10 are moved to adjust a height of the seat cushion 2 by way of the front and rear legs 7 and 8, respectively.

The conventional seat cushion pumping device 20 suffers from defects in that, since the front and rear portions of the seat cushion 2 are separately adjusted in their heights, it is difficult to hold the front and rear portions of the seat cushion 2 at the same height.

Specifically, because the front and rear knobs 4 and 5 are rotated like a dial, a substantial amount of operating force is required, and thereby, inconvenience is caused upon using the seat cushion pumping device 20.

SUMMARY OF THE INVENTION

Accordingly, the present invention has been made in an effort to solve the problems occurring in the related art, and an object of the present invention is to provide a seat cushion pumping device for a vehicle which is solely used to allow a height of an entire seat cushion to be easily adjusted with reduced operating force, thereby improving quality of a seat and ensuring convenience upon use.

In order to achieve the above object, according to the present invention, there is provided a seat cushion pumping device for a vehicle, adapted for adjusting a height of a seat cushion, comprising: a clutch section arranged between a clutch cover and one surface of a base member to generate operating force required for adjusting a height of the seat cushion; and a brake section arranged between a brake cover and the other surface of the base member to conserve operating force of the clutch section; wherein the clutch section includes a pair of clutch blocks accommodated in a clutch groove defined on one surface of the base member; a lever block interposed between the pair of clutch blocks to operate them; and a lever coupled with the lever block and having a lever spring; and wherein the brake section includes a link connection gear secured around a shaft extending through a shaft hole defined in the brake cover, and meshed with a gear of link means; an operating plate secured around the shaft while being positioned between the link connection gear and the base member, and accommodated in a brake groove defined on the brake cover, the operating plate having flattened portions and being defined at both ends of the flattened portion with a pair of inclined wedge-shaped grooves; power transmitting projections integrally formed on the other surface of the base member, and fitted into grooves defined on a circumferential outer surface of the operating plate to transmit operating force of the clutch section to the operating plate; brake pins each accommodated in a space defined between the inclined wedge-shaped groove and the brake cover to transmit operating force of the base member only in an operating direction and prevent operating force transmission in a reverse direction; brake springs each installed between two brake pins to be capable of fixedly maintaining the brake pins in the space defined between the inclined wedge-shaped groove and the brake cover; and pushing pins integrally formed at both sides of the power transmitting projections to free the brake pins when the lever is returned to its original position.

BRIEF DESCRIPTION OF THE DRAWINGS

The above objects, and other features and advantage of the present invention will become more apparent after a reading of the following detailed description when taken in conjunction with the drawings, in which.

DETAILED DESCRIPTION OF PREFERRED EMBODIMENTS

Figure 1:
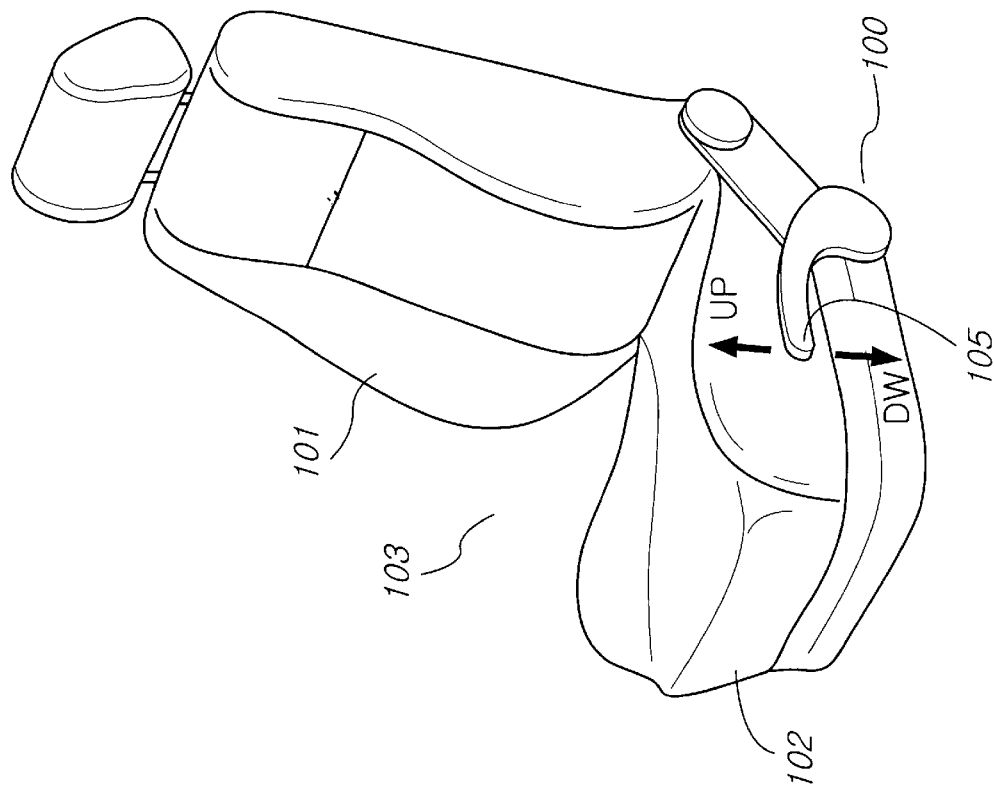
FIG. 1 is a perspective view illustrating a state wherein a seat cushion pumping device in accordance with an embodiment of the present invention is applied to a seat cushion of a vehicle.
Figure 2:
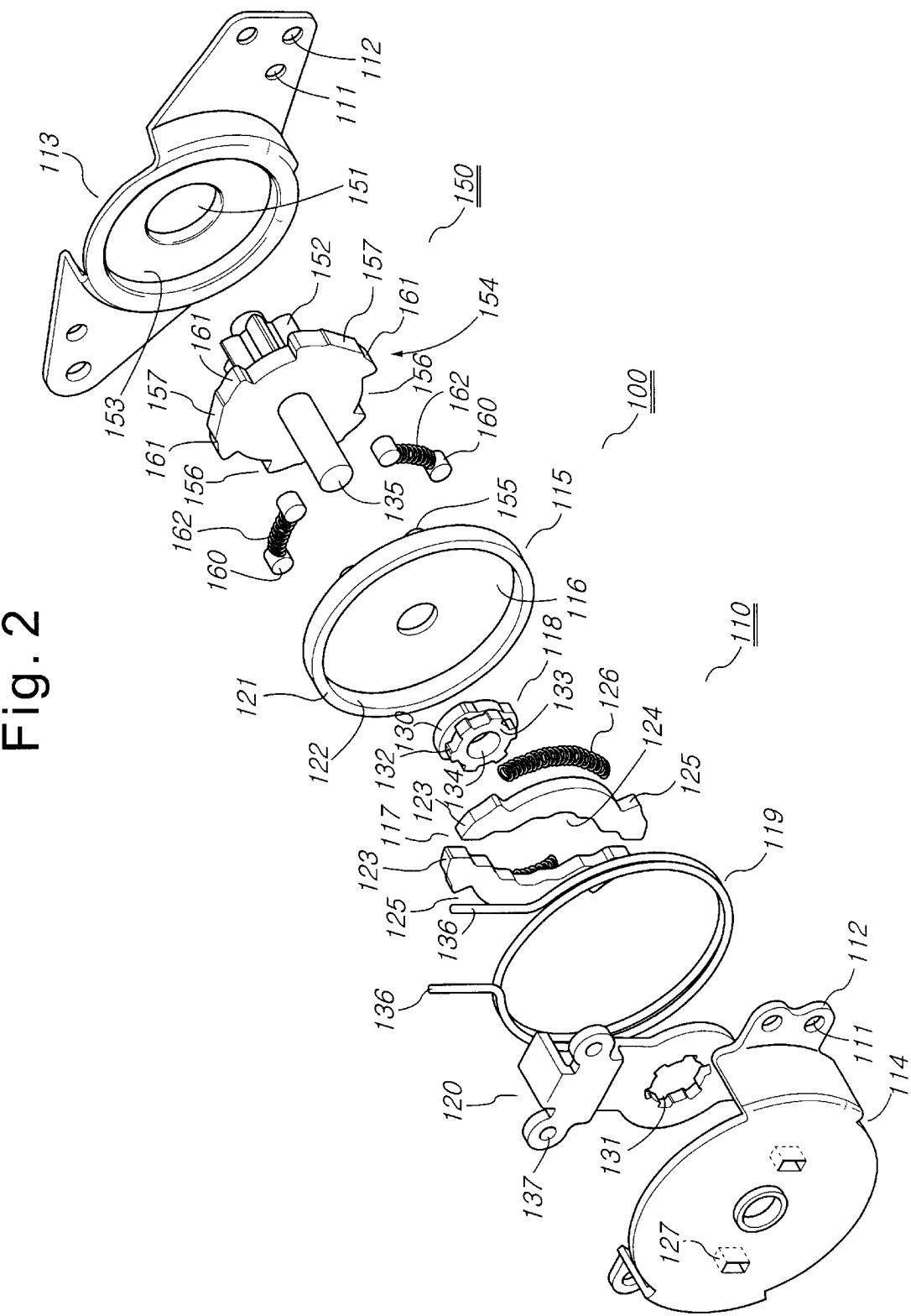
FIG. 2 is an exploded perspective view illustrating the seat cushion pumping device for a vehicle according to the present invention.
Figure 3:
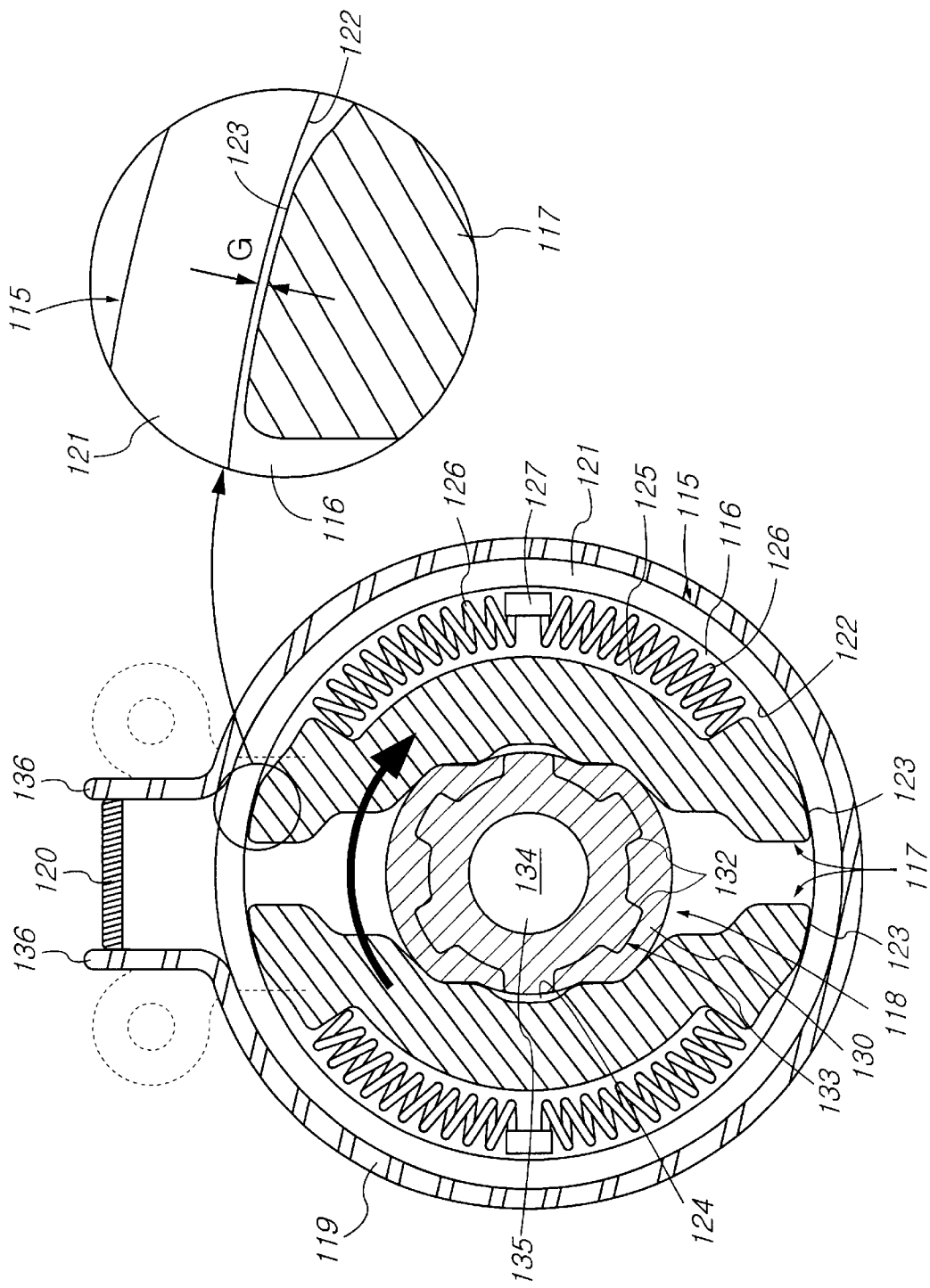
FIG. 3 is a partially enlarged cross-sectional view illustrating a state before a clutch is actuated in the seat cushion pumping device according to the present invention.
Figure 4:
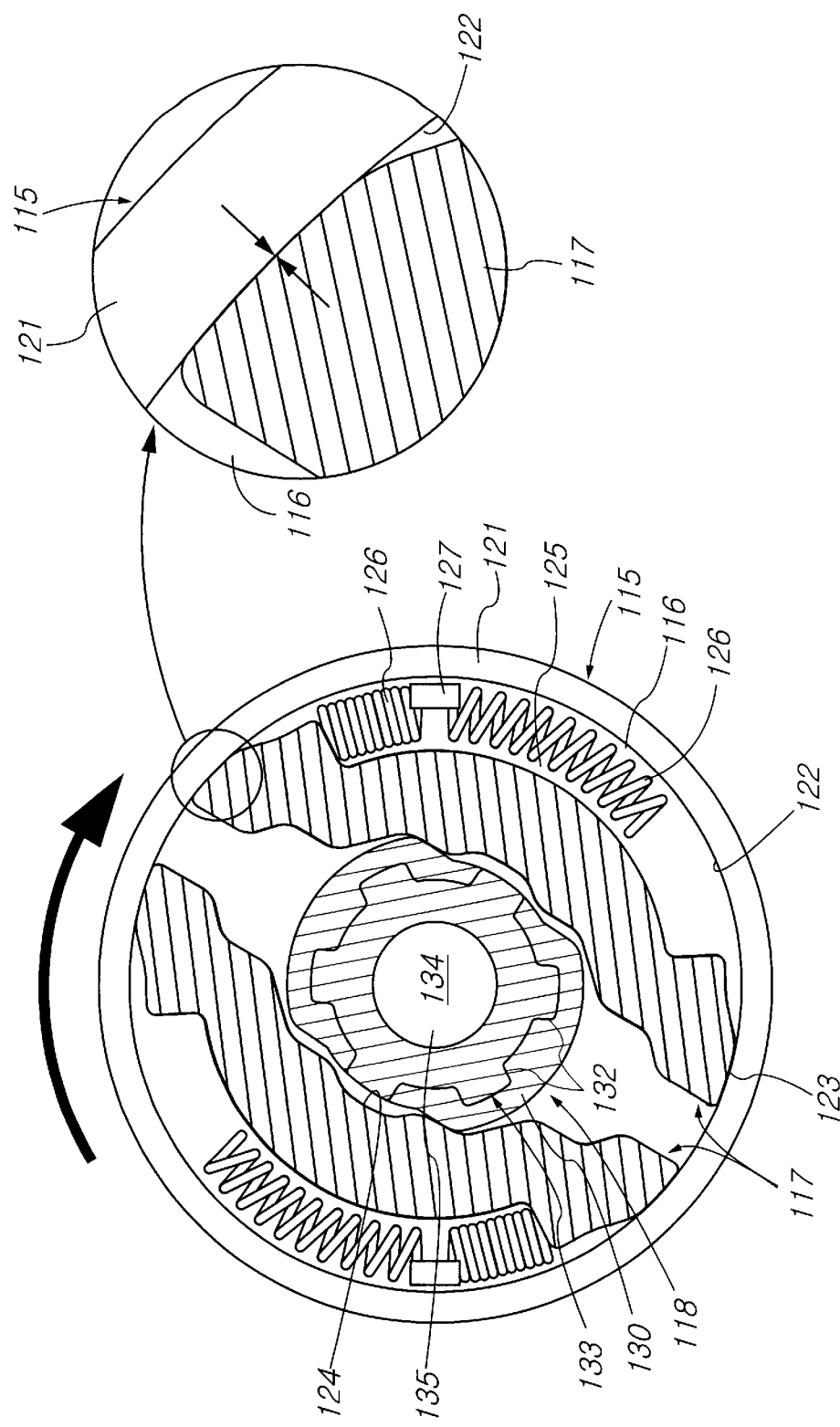
FIG. 4 is a partially enlarged cross-sectional view illustrating a state wherein the clutch is actuated in the seat cushion pumping device according to the present invention.
Figure 5:
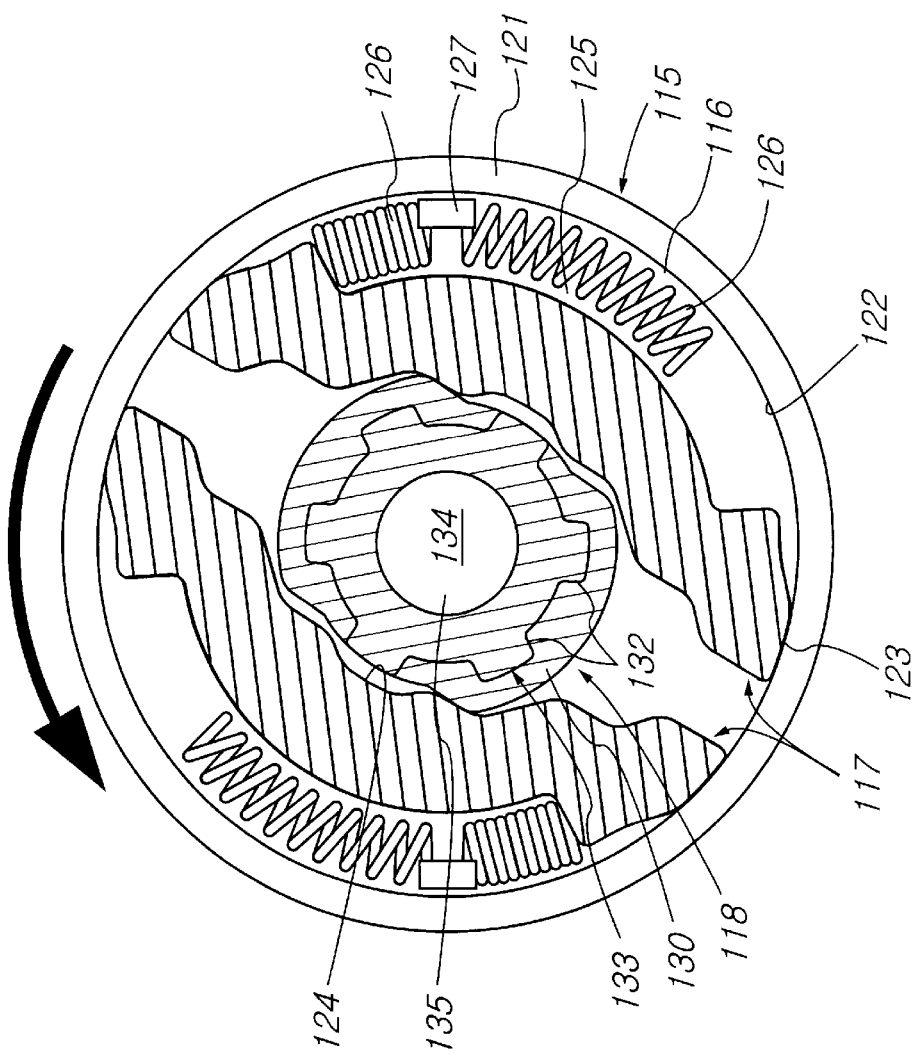
FIG. 5 is a cross-sectional view illustrating a state before the clutch is returned to its original position after being actuated, in the seat cushion pumping device according to the present invention.
Figure 6:
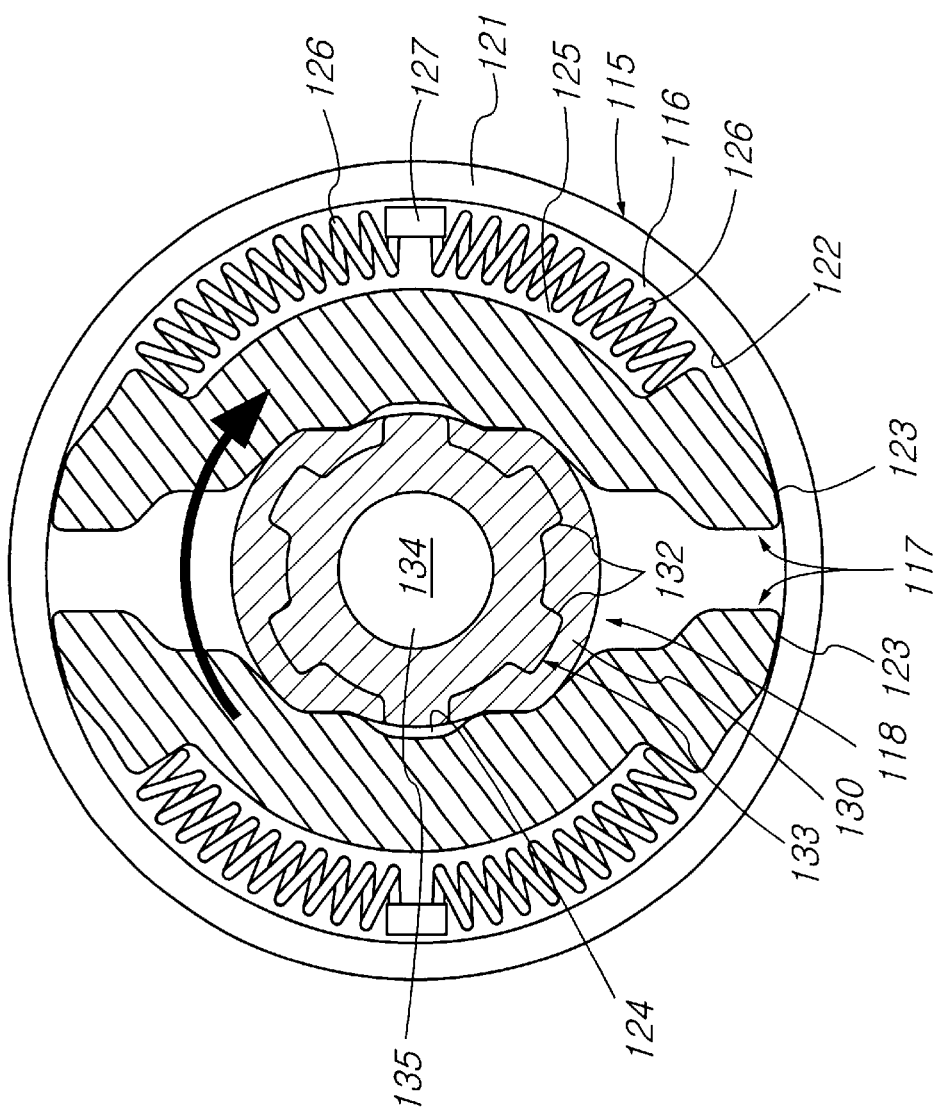
FIG. 6 is a cross-sectional view illustrating a state wherein the clutch is returned to its original position after being actuated, in the seat cushion pumping device according to the present invention.
Figure 7:
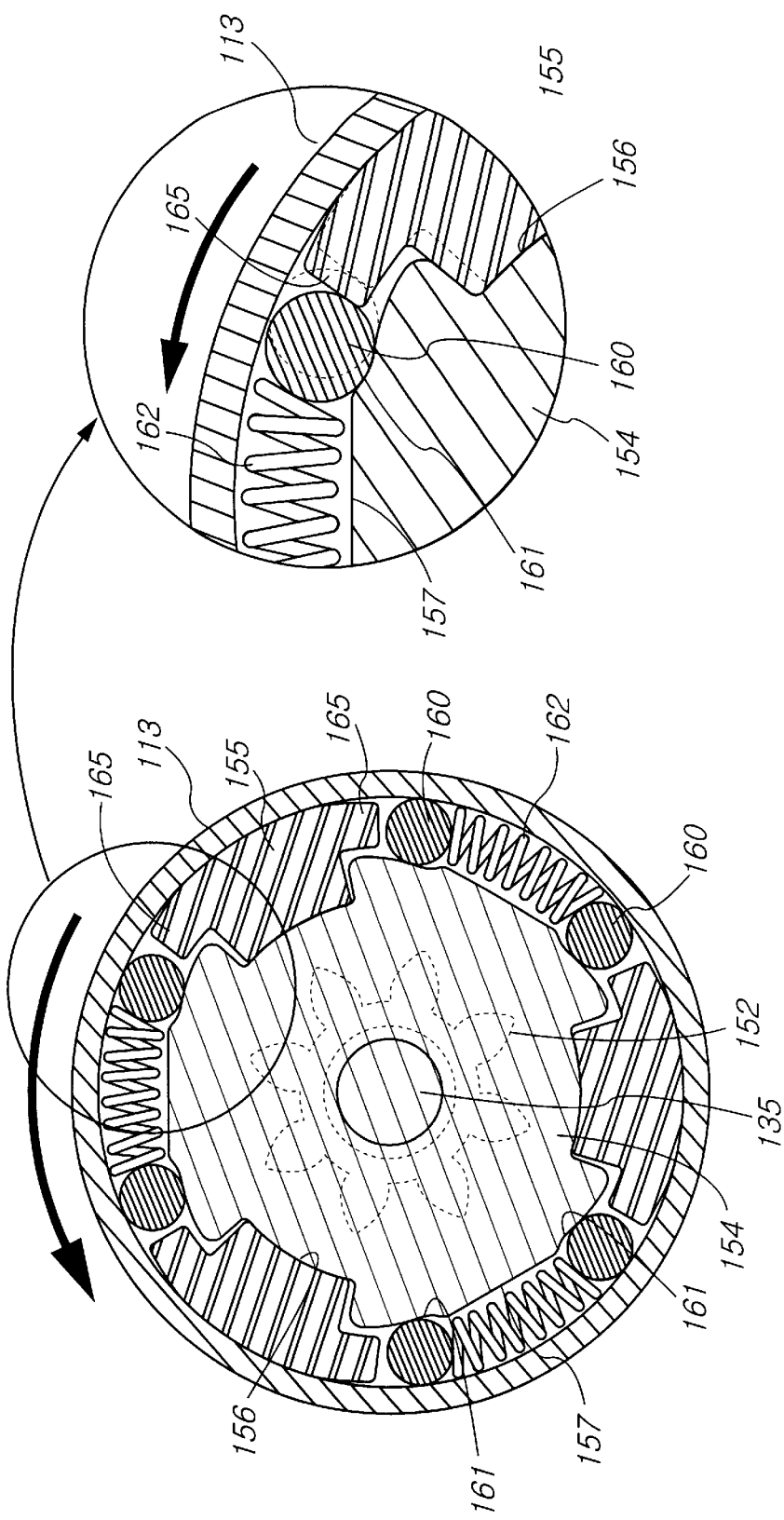
FIG. 7 is a partially enlarged cross-sectional view illustrating a brake which is in an inoperative position while the clutch is actuated, in the seat cushion pumping device according to the present invention.
Figure 8:
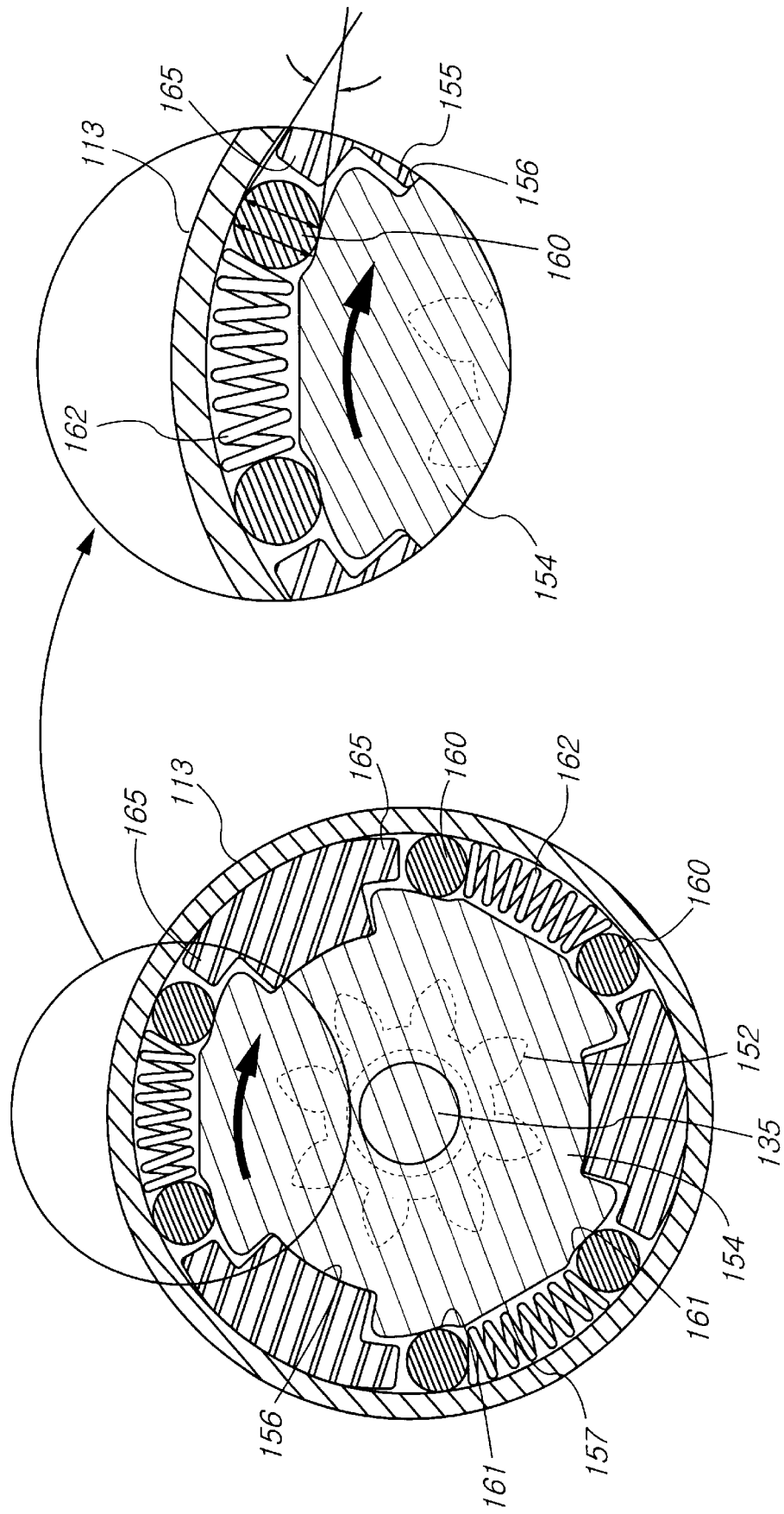
FIG. 8 is a partially enlarged cross-sectional view illustrating the brake which is in an operative position while the clutch is returned to its original position after being actuated, in the seat cushion pumping device according to the present invention.
Figure 9:
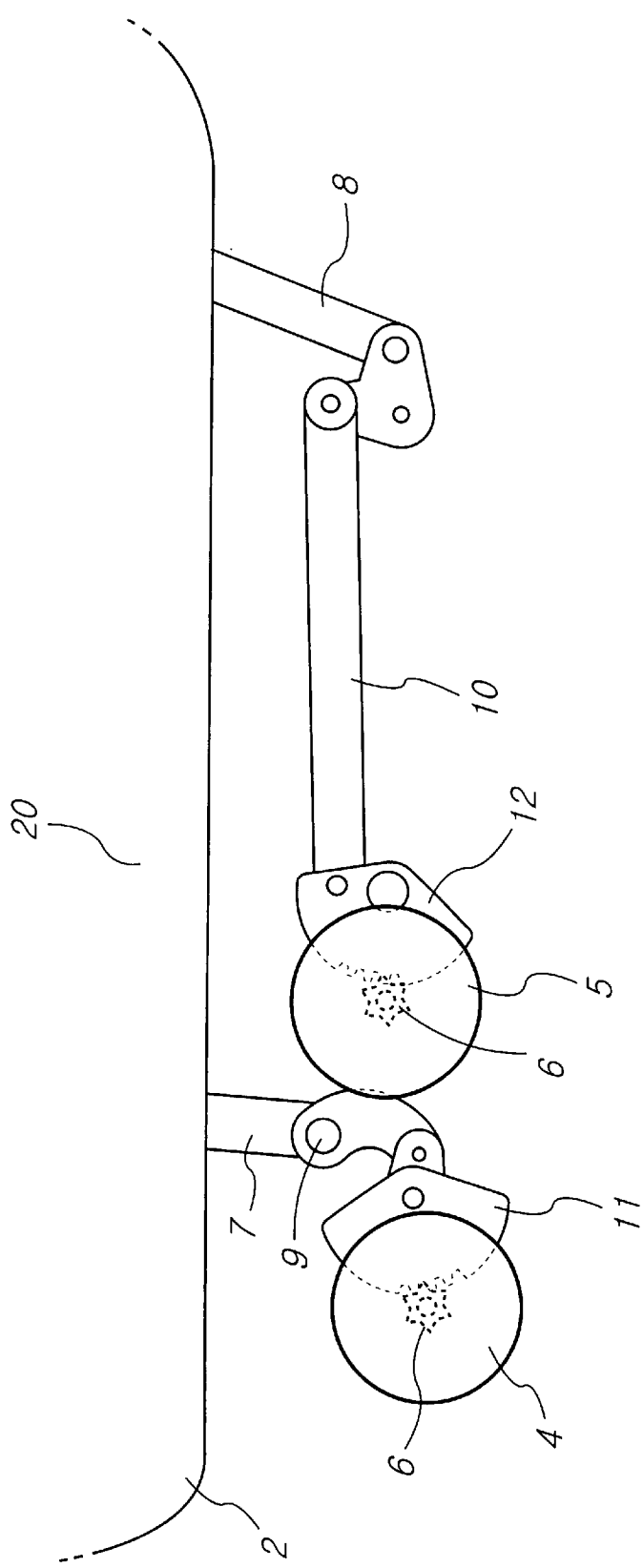
FIG. 9 is a schematic side view illustrating a state wherein a conventional seat cushion pumping device is applied to a seat cushion of a vehicle.

Reference will now be made in greater detail to a preferred embodiment of the invention, an example of which is illustrated in the accompanying drawings. Wherever possible, the same reference numerals will be used throughout the drawings and the description to refer to the same or like parts.

Link means is installed on front and rear portions of a lower surface of a seat cushion 102 which cooperates with a seat back 101 to constitute a seat 103, and gears are provided to operate the link means.

A seat cushion pumping device 100 in accordance with an embodiment of the present invention is disposed at a side of the seat 103 to be operatively associated with the gears. As can be readily seen from FIG. 1, when viewing the seat 103 from the outside, only a handle 105 of the seat cushion pumping device 100 is exposed to the outside.

As shown in FIGS. 2 through 8, the seat cushion pumping device 100 according to the present invention comprises a clutch section 110 for transmitting rotating force to the gears of the link means in a desired direction where the seat cushion 102 is to be moved, and a brake section 150 for conserving operating force of the clutch section 110 as it is.

The clutch section 110 and the brake section 150 are accommodated between a brake cover 113 and a clutch cover 114 each having a bracket 112 which is defined with locking holes 111. Sizes of the brake cover 113 and the clutch cover 114 are determined in a manner such that they can accommodate the entire seat cushion pumping device 100 therebetween. A base member 115 is placed between the brake cover 113 and the clutch cover 114. The clutch section 110 is arranged between the clutch cover 114 and the base member 115, and the brake section 150 is arranged between the brake cover 113 and the base member 115.

The clutch section 110 includes a pair of clutch blocks 117 accommodated in a clutch groove 116 defined on one surface of the base member 115, a lever block 118 interposed between the pair of clutch blocks 117 to operate them, and a lever 120 coupled with the lever block 118 and having a lever spring 119.

The clutch blocks 117 are formed at their upper and lower ends with friction surfaces 123. The friction surfaces 123 can be brought into contact with a drum 122 which corresponds to an inner surface of a rim 121 defining the clutch groove 116, to transmit power of the lever 120 to the base member 115, and can be separated from the drum 122 to prevent power of the lever 120 from being transmitted to the base member 115. It is preferred that a diameter of the clutch blocks 117, which is measured between two friction surfaces 123, is smaller than that of the drum 122.

Radial inner surfaces of the clutch blocks 117 are defined with lever block grooves 124 in a manner such that a diameter of the clutch blocks 117 can be increased by the lever block 118 coupled with the lever 120. Radial outer surfaces of the clutch blocks 117 are defined with spring grooves 125 in each of which a pair of clutch springs 126 are received to allow the clutch block 117 rotated by the lever block 118 to be returned to its original position.

A pair of spring retainers 127 are projectedly formed on an inner surface of the clutch cover 114. The pair of clutch springs 126 are received in each spring groove 125 in a manner such that one ends of the pair of clutch springs 126 which face each other are fastened to the spring retainer 127. Therefore, the pair of clutch springs 126 are positioned up and down in each spring groove 125 and function to return the operated clutch block 117 to its original position.

The lever block 118 has an operating part 130 and a coupling part 133. The operating part 130 is inserted into the lever block grooves 124 of the clutch blocks 117. The coupling part 133 projects forward from the operating part 130 and is formed with external prominences and depressions 132 which are meshed with internal prominences and depressions 131 formed in the lever 120.

A shaft hole 134 is defined at a center portion of the lever block 118 to allow the lever block 118 to be supported by a shaft 135 which extends through the brake cover 113, clutch cover 114 and base member 115.

An upper portion of the lever 120 coupled with the lever block 118 is bent toward the base member 115 in a manner such that both ends 136 of the lever spring 119 which is placed around the base member 115 are seated on both side surfaces of the bent portion, respectively. Adjacent to the bent portion, the lever 120 is defined with a pair of fastening holes 137 for allowing the handle 105 to be fastened to the lever 120.

The brake section 150 includes a link connection gear 152 which is secured around the shaft 135 extending through a shaft hole 151 defined in the brake cover 113, and meshed with the gears of the link means. An operating plate 154 is positioned between the link connection gear 152 and the base member 115. The operating plate 154 is secured around the shaft 135 and accommodated in a brake groove 153 defined on the brake cover 113.

Grooves 156 are defined on a circumferential outer surface of the operating plate 154 to be spaced apart one from another by the same angle in a circumferential direction. Power transmitting projections 155 integrally formed on the other surface of the base member 115 are fitted into the grooves 156 so that power of the base member 115 can be transmitted to the operating plate 154.

The operating plate 154 is also formed, on the circumferential outer surface thereof, with flattened portions 157, and defined, at both ends of each flattened portion 157, with a pair of inclined wedge-shaped grooves 161. Each of brake pins 160 is accommodated in a space defined between the inclined wedge-shaped groove 161 and the brake cover 113 to transmit only in an operating direction power of the base member 115 to the operating plate 154 having the link connection gear 152 and prevent operating force transmission in a reverse direction. In this way, the brake pins 160 play a role of a one-way clutch.

In other words, a pair of brake pins 160 are respectively positioned in the pair of inclined wedge-shaped grooves 161 which are defined at both ends of each flattened portion 157. Each of brake springs 162 is installed between the pair of brake pins 160.

Pushing pins 165 are integrally formed at both sides of the power transmitting projections 155 which are integrally formed with the base member 115. The pushing pins 165 are positioned adjacent to the brake pins 160.

Describing operations of the seat cushion pumping device 100 according to the present invention, constructed as mentioned above, when an occupant manipulates the handle 105 in upward or downward directions UP and DW, as the link means installed on the lower surface of the seat cushion 102 is lifted or lowered in a corresponding direction, a height of the seat cushion 102 can be adjusted in conformity with a desire of the occupant.

Because the seat cushion pumping device 100 is operated in the same manner irrespective of whether the handle 105 is manipulated in the upward direction UP or the downward direction DW, an operating principle will be described hereafter with respect to only one operating direction.

By grasping and pulling in the upward direction UP or pushing in the downward direction DW the handle 105 exposed out of the seat 103, the lever 120 of the clutch section 110, which is connected to the handle 105, is operated.

As the lever 120 operates the lever block 118, the lever block 118 is rotated in the same direction as the handle 105 and enlarges a diameter of the clutch blocks 117. By this fact, as the friction surfaces 123 of the clutch blocks 117 are brought into contact with the drum 122 of the base member 115, a gap G is removed and the base member 115 is also rotated integrally with the clutch blocks 117.

If the clutch blocks 117 are rotated, one of the pair of clutch springs 126, which are received in each spring groove 125 defined on the radial outer surface of each clutch block 117, is compressed to be ready to return the clutch blocks 117 to their original positions. In this connection, it is to be readily understood that, if an upper one of the pair of clutch springs 126 is compressed in one spring groove 125, a lower one of the pair of clutch springs 126 is compressed in the other spring groove 125.

If the base member 115 is rotated, due to the fact that the power transmitting projections 155 formed on the other surface of the base member 115 are fitted into the grooves 156 defined on the operating plate 154 of the brake section 150, the operating plate 154 is also rotated.

As a consequence, the shaft 135 around which the operating plate 154 is secured is also rotated, and the link connection gear 152 secured around the shaft 135 rotates the gears of the link means to lift or lower the seat cushion 102 in the direction where the handle 105 is manipulated.

At this time, as the base member 115 receiving rotating force from the lever 120 is rotated, the pushing pins 165 integrally formed at both sides of the power transmitting projections 155, which in turn are integrally formed on the other surface of the base member 115, move the brake pins 160 positioned in the inclined wedge-shaped grooves 161 which are defined at both ends of the flattened portions 157 of the operating plate 154, toward wide space portions in a manner such that the brake pins 160 are not fixedly maintained between the inclined wedge-shaped grooves 161 and the brake groove 153 of the brake cover 113.

After the operating plate 154 is rotated by a certain angle in this way, by returning the handle 105 to its original position and re-manipulating the handle 105, the seat cushion 102 can be raised or lowered again.

Return of the handle 105 to its original position is facilitated by the fact that, among the component parts constituting the clutch section 110, the lever spring 119 and the clutch springs 126, which are tensioned and compressed while the lever 120 is operated, return to their original positions.

In detail, once operation of the lever 120 is completed, the lever 120 is returned to its original position by elastic force of the lever spring 119 both ends 136 of which are further separated from each other in the direction where the lever 120 is operated. At the same time, as the compressed ones of the clutch springs 126, which are received in the spring grooves 125 of the clutch blocks 117, are returned to their original positions, the lever block 118, clutch blocks 117 and lever 120 are also returned to their respective original positions.

Even though the lever block 118, clutch blocks 117 and the lever 120 are returned to their respective original positions, the base member 115 is maintained in a rotated state. The reason for this is that, while the lever block 118 of the clutch section 110 is rotatably supported by the shaft 135, the operating plate 154 and the link connection gear 152 of the brake section 150 are rigidly secured around the shaft 135.

In this regard, although the base member 115 is not secured around the shaft 135, due to the fact that the power transmitting projections 155 formed on the other surface of the base member 115 are fitted into the grooves 156 of the operating plate 154, the base member 115 is prevented from returning to its original position.

Specifically, when the base member 115 is rotated and then the lever 120 is returned to its original position, while rotating force is applied to the operating plate 154, the brake pins 160, which are intervened between the operating plate 154 and the brake cover 113, are moved toward narrow space portions of the inclined wedge-shaped grooves 161 defined on the operating plate 154, by elastic force of the brake springs 162, in a manner such that the brake pins 160 are fixedly maintained between the inclined wedge-shaped grooves 161 and the brake groove 153 of the brake cover 113.

After the handle 105 returns to its original position through the above-described course, by manipulating again the handle 105 in a desired direction, the lever 120, lever block 118, clutch blocks 117, base member 115, operating plate 154, and link connection gear 152 are sequentially rotated, and thereby the seat cushion 120 can be lifted or lowered. Thereafter, by releasing the handle 105, the lever spring 119, clutch springs 126, lever 120, clutch blocks 117 are returned to their respective original positions. And, the brake springs 162 apply elastic force to the brake pins 160 to fixedly maintain the base member 115, operating plate 154 and the link connection gear 152. In this way, one operating cycle is completed.

By repeating the above-described operations, it is possible to adjust a height of the seat cushion 102 in conformity with a body figure of the occupant, by using only one handle 105. Also, since large operating force is not required, the seat cushion pumping device 100 according to the present invention can be easily operated.

As apparent from the above description, the seat cushion pumping device for a vehicle according to the present invention provides advantages in that, since the seat cushion pumping device is solely used to allow a height of an entire seat cushion to be easily adjusted with reduced operating force, quality of a seat is improved and convenience is ensured upon using the seat cushion pumping device.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A seat cushion pumping device for a vehicle, adapted for adjusting a height of a seat cushion, comprising:

a clutch section arranged between a clutch cover and one surface of a base member to generate operating force required for adjusting a height of the seat cushion; and a brake section arranged between a brake cover and the other surface of the base member to conserve operating force of the clutch section;

wherein the clutch section includes a pair of clutch blocks accommodated in a clutch groove defined on one surface of the base member; a lever block interposed between the pair of clutch blocks to operate them; and a lever coupled with the lever block and having a lever spring; and wherein the brake section includes a link connection gear secured around a shaft extending through a shaft hole defined in the brake cover, and meshed with a gear of link means; an operating plate secured around the shaft while being positioned between the link connection gear and the base member, and accommodated in a brake groove defined on the brake cover, the operating plate having flattened portions and being defined at both ends of the flattened portion with a pair of inclined wedge-shaped grooves; power transmitting projections integrally formed on the other surface of the base member, and fitted into grooves defined on a circumferential outer surface of the operating plate to transmit operating force of the clutch section to the operating plate; brake pins each accommodated in a space defined between the inclined wedge-shaped groove and the brake cover to transmit operating force of the base member only in an operating direction and prevent operating force transmission in a reverse direction; brake springs each installed between two brake pins to be capable of fixedly maintaining the brake pins in the space defined between the inclined wedge-shaped groove and the brake cover; and pushing pins integrally formed at both sides of the power transmitting projections to free the brake pins when the lever is returned to its original position.

2. The device as set forth in claim 1, wherein the clutch blocks are formed at their both ends with friction surfaces which can be brought into contact with a drum provided to the base member to transmit operating force of the lever to the base member and can be separated from the drum to prevent operating force of the lever from being transmitted to the base member; radial inner surfaces of the clutch blocks are defined with lever block grooves in a manner such that a diameter of the clutch blocks can be increased by the lever block coupled with the lever to generate frictional force in cooperation with the drum; radial outer surfaces of the clutch blocks are defined with spring grooves in each of which a pair of clutch springs are received in a manner such that one ends of the pair of clutch springs which face each other are fastened to a spring retainer, to allow the clutch block rotated by the lever block to be returned to its original position.

* * * * *